4 Sheets—Sheet 1.
J. L. HARDEMAN.
Harvesting Machine.
No. 1,202.
Reissued June 18, 1861.
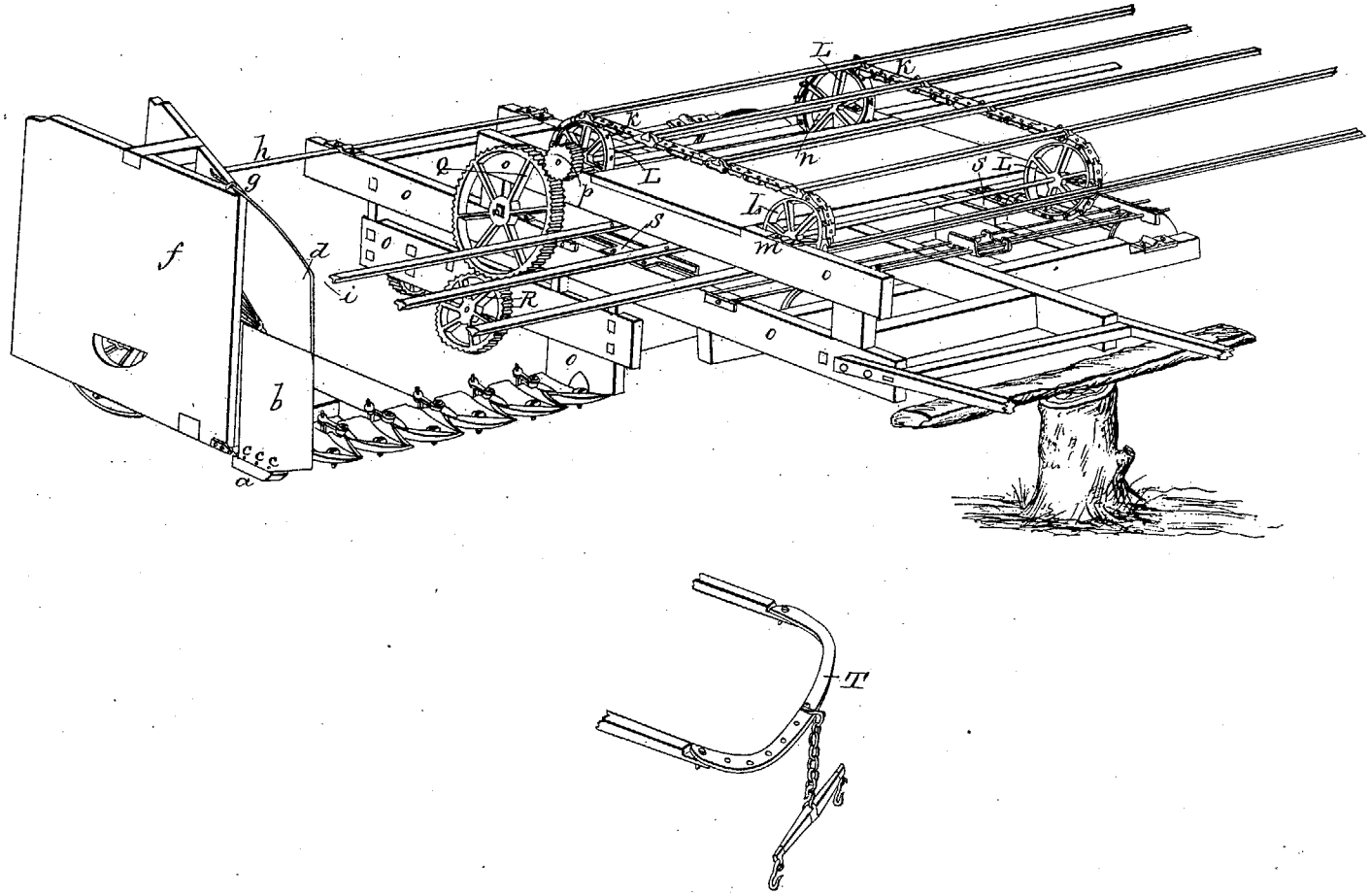
N. PETERS, Photo-Lithographer, Washington, D. C.

J. L. HARDEMAN.
Harvesting Machine.
No. 1202.
Reissued June 18, 1861.
Plate No. 3
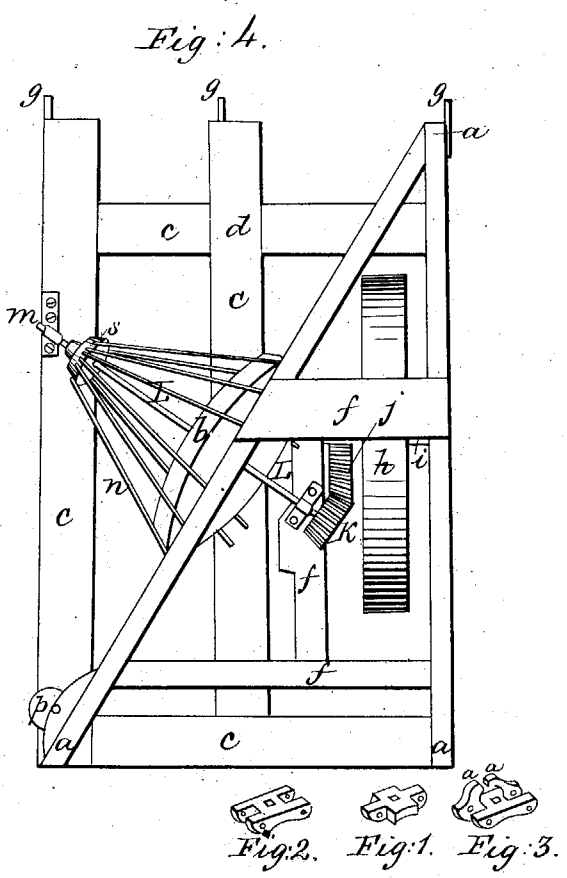
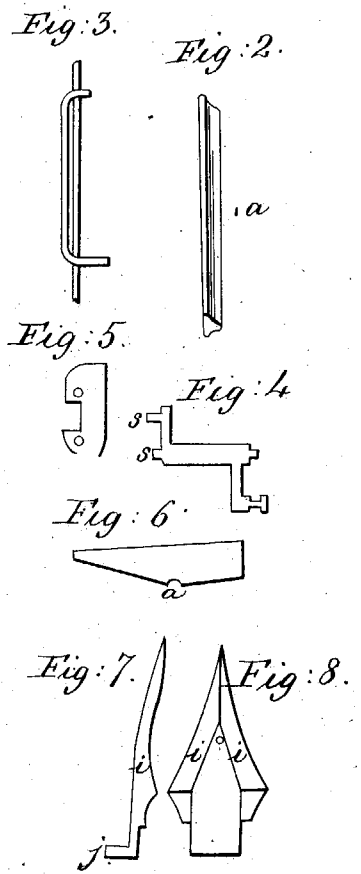
Plate No. 2
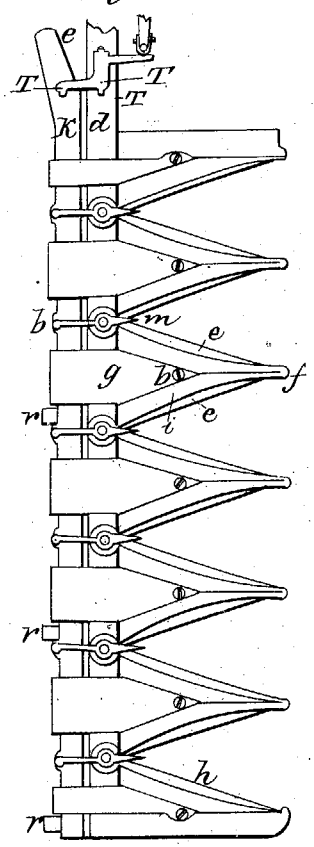
N. PETERS, Photo-Lithographer, Washington, D. C.

4 Sheets—Sheet 3.
J. L. HARDEMAN.
Harvesting Machine.
No. 1,202.
Reissued June 18, 1861.
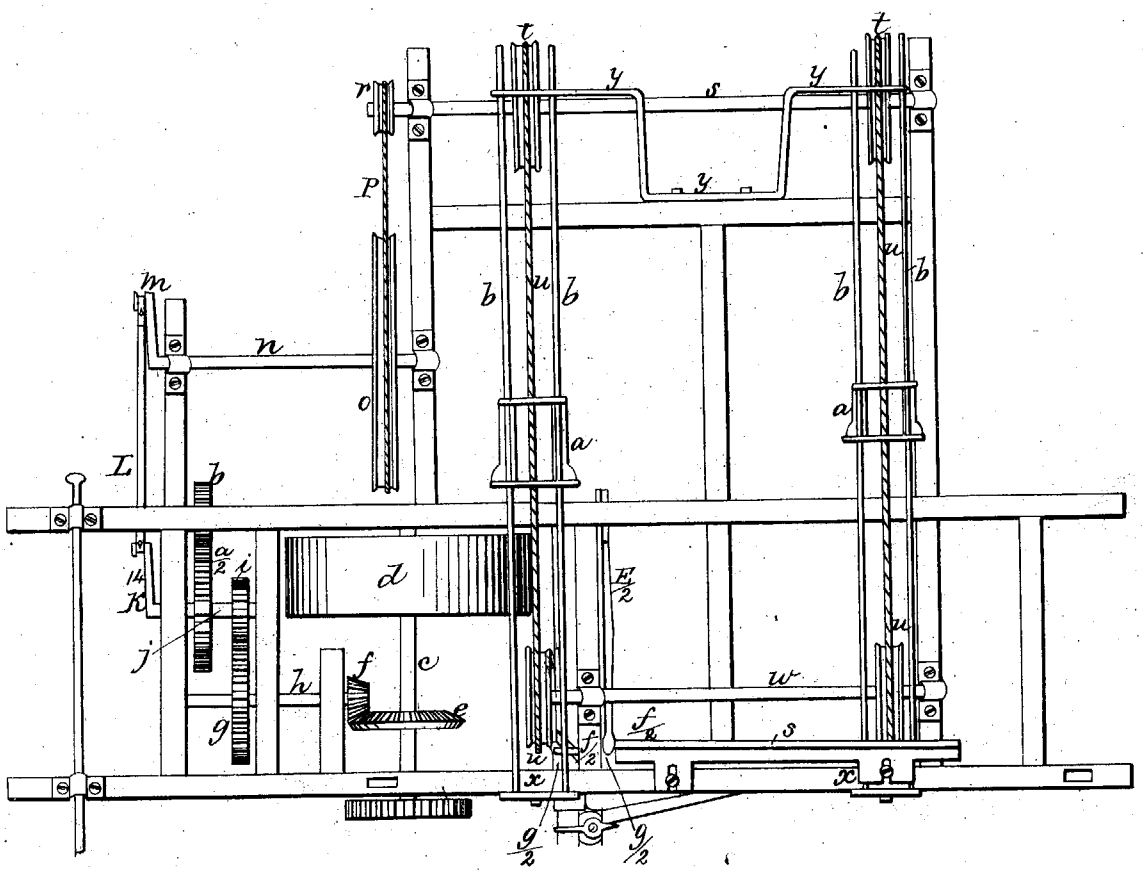
Plate No. 4.
N. PETERS, Photo-Lithographer, Washington, D. C.

J. L. HARDEMAN.
Harvesting Machine.
No. 1,202.
Reissued June 18, 1861.
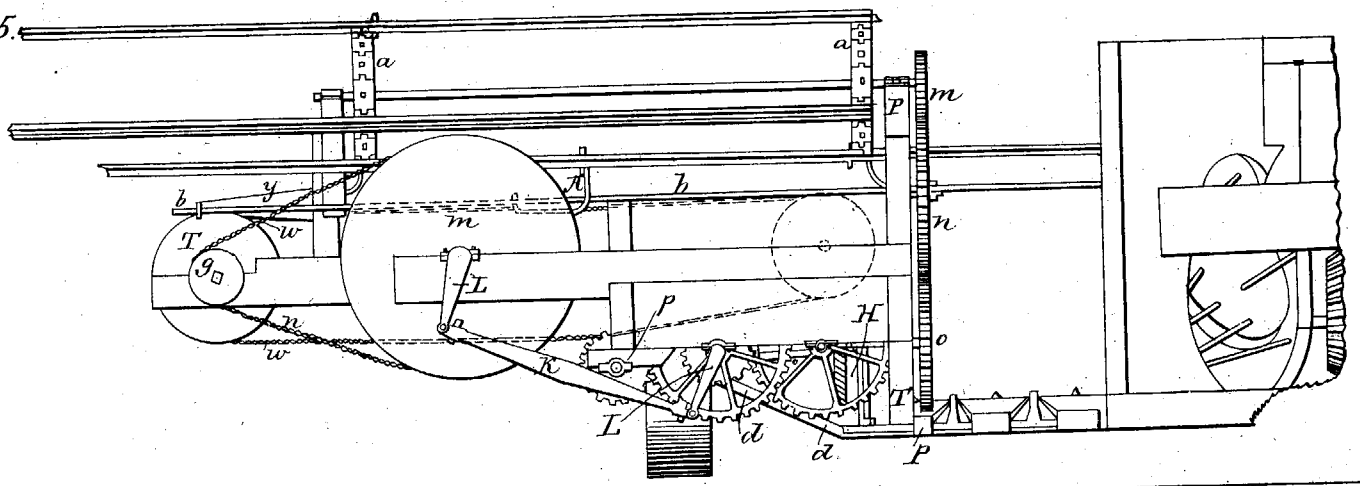
Plate. No. 5.
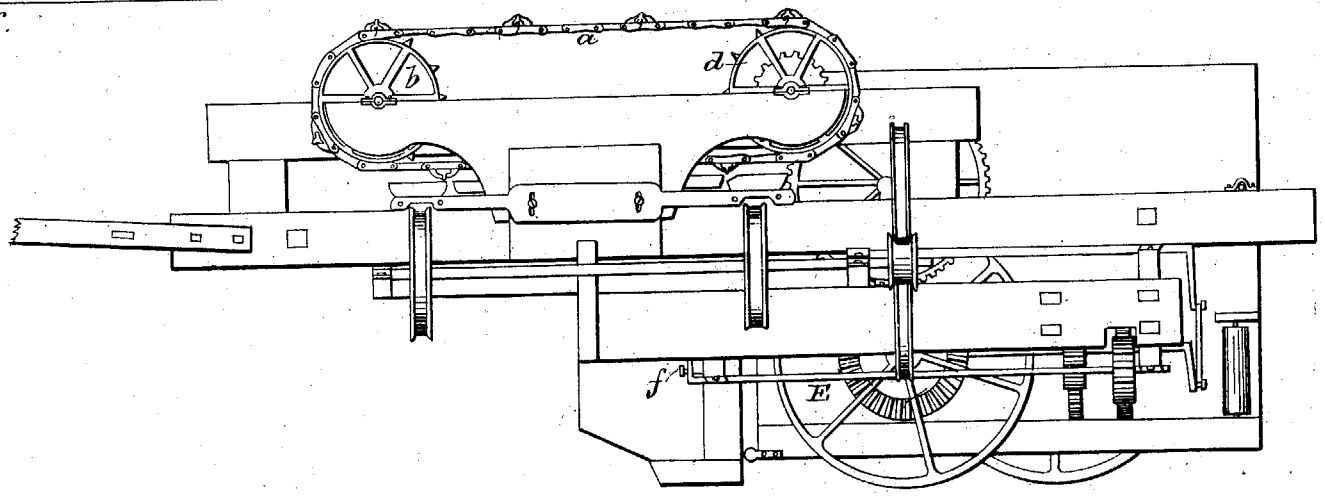
Plate. No. 6.
N. PETERS, Photo-Lithographer, Washington, D. C.

UNITED STATES PATENT OFFICE.

WM. N. WHITELEY, OF SPRINGFIELD, OHIO, ASSIGNEE, BY MESNE ASSIGNMENTS, OF JOHN LOCKE HARDEMAN, DECEASED.

IMPROVEMENT IN MACHINES FOR CUTTING HEMP, &c.

Specification forming part of Letters Patent No. 7,578, dated August 20, 1850; Reissue No. 1,202, dated June 18, 1861.

DIVISION C.

*To all whom it may concern:*

Be it known that JOHN LOCKE HARDEMAN, of near Arrow Rock, Saline county, and State of Missouri, invented a new and improved mode of constructing the rack, comb, or reel of harvesting-machines for pressing the hemp, millet, other grain, &c., back against the cutters, of which the following is a full, clear, and exact description, reference being had to the accompanying drawings, forming a part of this specification, by plates, figures, and letters.

The rack or comb is intended to sustain the hemp or other material while being cut, and until the motion of the machine forward shall have given the butt-ends of the hemp or other material a sufficient inclination forward to insure its falling back upon the sustaining-rod *h* or receiver. Two endless chains *a*, Plates 5 and 6, are made of thirty-six links of cast-iron each, three inches in length between rivets, three inches wide, and one inch thick. Of these one-half are represented by Fig. 1, Plate 3, one-fourth by Fig. 2, Plate 3, each having a square mortise in the center to fit the points on the wheels *b* and *d*, Plate 6. The remaining fourth are represented by Fig. 3, Plate 3, and are similar to those represented by Fig. 2, plate 3, with the addition of spines *a a*, Plate 3, Fig. 3, on the outer surface of the link through which the swords *b*, Plate 5, and *i*, Plate 1, pass, making one sword for every four links, or nine swords in all. These swords, a section of which is represented by Fig. 2, Plate 2, are formed of steel, eight feet long and one and a half inch wide, and ribbed like a bayonet, to secure the requisite amount of strength. A cross-pin, *a*, Plate 2, Fig. 2, projects from the center one inch on each side, by which it is moved backward and forward, worked by the pallets *a a*, Plate 4, and A, Plate 5. Figs. 3 and 5, Plate 2, represent a side and end view of the pallets, each of which runs upon two rods, *b b b b*, Plates 4 and 5. These endless chains K K, Plate 1, are worked by four wheels, L L L L, Plate 1, each having twelve points on the circumference, working into the mortises in the links of the chains. The two forward wheels, *m*, Plate 1, are hung on a shaft four feet four inches long and one and a quarter inch in diameter; the hindmost wheels, *n*, Plate 1, on a shaft one and a half inch in diameter, four feet seven inches long, and projecting over the frame-work *o o o o o o*, Plate 1, far enough to receive the pinion P, Plate 1, six inches in diameter; eighteen cogs driven by an auxiliary wheel or pinion, Q, Plate 1; fifty-four cogs which are driven by a wheel, R, Plate 1, twelve inches in diameter; thirty-six cogs placed upon the main shaft C, Plate 4, of the machine. The driving-wheel *d*, Plate 4, two feet in diameter and ten inches wide, is of cast-iron, (as all the wheels are,) and supports the machine upon shaft C, Plate 4, two feet three inches long, two and a half inches square, on which is a bevel-wheel, *e*, Plate 4, one foot in diameter, thirty-six cogs matching into a pinion, *f*, Plate 4, twelve cogs. Its shaft *h*, Plate 4, is one foot ten inches long, with a wheel, *g*, Plate 4, upon it, one foot in diameter, thirty-six cogs, matching into a pinion, *i*, Plate 4, of eighteen cogs, hung upon a shaft, *j*, Plate 4, one foot long, one and a quarter inch square, having a crank, *k*, Plate 4, and I, Plate 5, five inches long on the outer end, which works a pitman, L, Plate 4, and *k*, Plate 5, two feet long, attached to one and working another crank, *m*, Plate 4, and L, Plate 5, seven and a half inches long. The shaft *n*, Plate 4, of this crank is three feet five inches long, one and a quarter inch square, and has upon it a light wooden wheel, *o*, Plate 4, and *m*, Plate 5, thirty-two inches in diameter, driven by a cord, P, Plate 4, a small pulley, *r*, Plate 4, and *g*, Plate 5, three inches in diameter. The shaft S, Plate 4, is four feet five inches long, one and a quarter inch square, has upon it, besides the small pulley *r*, Plate 4, two wooden wheels, *t t*, Plates 4 and 5, eleven inches in diameter, with cords *u u*, Plates 4 and 5, passing from these wheels over two similar wheels, *v v*, Plate 4, upon a shaft, W, Plate 4, three feet four inches long, and connecting with pallets *a a*, Plate 4, and A, Plate 5. Just above these wheels *t t* and *v v*, Plate 4, and on each side, are parallel rods *b b b b*, Plates 4 and 5, three-eighths of an inch in diameter, upon which the pallets slide.

These rods are sustained on the right, *x x*, Plate 4, by the frame-timbers, and on the left by an iron support, *y y y*, Plates 4 and 5.

Now, the manner of operating the rack is as follows, viz: It will be seen that the driving-wheel *d*, Plate 4, puts in motion two sets of gearing. First, the revolving rack or comb imparting to it a motion just equal the progress of the machine forward, consequently the lower side of the chains are stationary with regard to the ground or standing hemp, &c.; secondly, the wheels, cranks, &c., which work the pallets, giving to them a back-and-forth motion, which is obtained by the unequal lengths of the cranks employed, and the pallets are used alternately in thrusting in and withdrawing the swords from the hemp, &c., as seen in Plate 1, two of the swords being at all times in the hemp, &c., while the others are carried forward over the wheels to the point where they are introduced into the hemp, &c. Guide-rails S S, Plate 1, are placed under the swords to insure the working of the pallets.

The frame-work is of solid oak timber two inches thick, and joined as in the plates, which are on a scale of two inches to the foot, except Plate 4, which is one and a third inch to the foot.

It will be observed that by the use of the rack as a substitute for the reel formerly in use many practical objections are overcome. For instance, in the construction and operation of this machine no outer reel-post is employed, and consequently the material being cut cannot catch and drag on a reel-post at the grain end of the machine or cutting apparatus, nor is there any central shaft used over the cutter to which reel-arms are connected. Such a shaft is liable to become clogged with straw which winds around it.

It will be observed that by causing the rack-ribs to move, as shown and described, (end first into the standing crop and backward in a horizontal plane instead of in an arc,) the rack has given to it two new functions, which are very useful when used in combination with a cutting apparatus which projects out from one side of the main ground-wheel frame, and has the cutters therewith driven by a crank and pitman. First, the rack-ribs by moving backward in a horizontal plane instead of in an arc prevents the difficulty heretofore experienced of the reel-ribs pressing the standing crop down as they pass into it downward, if standing broadcast on the ground, or leaning, or both. Again, the ribs of the rack moving back in a horizontal plane will insure a uniform operation and deposit of the cut material; and, secondly, the giving the rack-ribs an endwise thrust into the standing broadcast crop instead of a downward one enables them to raise all of the crop which is above them, though so much leaning as not to be gotten hold of when the rack-ribs come into it downward, and the withdrawing the reel-ribs endwise from the cut crop upon which they are operating frees them of anything which might hang on them.

It will be observed that the drawings hereinbefore referred to show the entire original invention, parts of which are filed simultaneously with this, designated Divisions A and B.

Having thus described the construction and operation of that portion of the invention made the subject of this application, what I claim as the invention of the said JOHN LOCKE HARDEMAN, deceased, and desire to secure by Letters Patent, is—

1. In combination with the main ground-wheel frame and cutting apparatus of harvesting-machines, the rack or comb which has no shaft passing through its center, and the ribs or fans of which have no connection with each other at their ends projecting over the cutting apparatus, substantially as described.

2. The use of the rack or comb as a substitute for the reel of the harvesting-machine, the ends of the ribs of said rack which are projected out over the cutting apparatus having no connection with each other or with said apparatus, substantially as described.

3. In combination with the main ground-wheel frame and cutting apparatus of harvesting-machines, the latter of which projects out from one side of the former, the rack or comb, the ribs or fans of which move backward in or nearly in a horizontal plane instead of in the arc of a circle, substantially as described.

WM. N. WHITELEY.

Witnesses:
SOL J. HOUCK,
REUBEN MILLER.